United States Patent Office 3,223,684
Patented Dec. 14, 1965

---

3,223,684
N-(PROPYNYL)-2-(THIAZOLE) SULFENAMIDES AS RUBBER ACCELERATORS
George E. P. Smith, Jr., Akron, Ohio, assignor to The Firestone Tire & Rubber Company, Akron, Ohio, a corporation of Ohio
No Drawing. Original application June 5, 1958, Ser. No. 739,989, now Patent No. 3,020,287, dated Feb. 6, 1962. Divided and this application Feb. 6, 1961, Ser. No. 87,108
18 Claims. (Cl. 260—79.5)

This application is a division of my copending application Serial No. 739,989, filed June 5, 1958, now Patent No. 3,020,287.

This invention relates to a new class of chemical compounds and to the application of these substances to the acceleration of rubber vulcanization.

Certain thiazole sulfenamides have been produced by reacting an alkylamine with mercaptobenzothiazole in the presence of an oxidizing agent such as chlorine. For example, n-butylamine has been condensed with 2-mercaptobenzothiazole in the presence of chlorine to produce N-n-butyl-2-benzothiazolesulfenamide, a low melting solid, which decomposes upon standing at room temperature. Although this prior sulfenamide, when freshly prepared, is a rubber vulcanization accelerator having moderately delayed-action properties, its potency gradually diminishes when it is stored.

During the last few years in the rubber industry the channel carbon blacks have been increasingly replaced by the newer reinforcing oil furnace blacks in pneumatic tire tread compositions. Several of the new furnace blacks, e.g., HAF, ISAF and SAF blacks, have become popular because they impart much longer tread life to tires than did the channel blacks. Whereas the channel blacks were acidic in reaction, the new furnace blacks are alkaline, displaying pH values above 7.0. Perhaps partly because of their alkalinity the new furnace blacks have been difficult to handle in modern high speed rubber processing equipment, because they tend to make rubber stocks "scorchy," the stocks tending to set up or precure before the end of the mechanical working of the stocks during processing in Banbury mixers, mills, calenders and extruders. A scorched stock, of course, must be scrapped. As typical of many prior accelerators, the butylbenzothiazole sulfenamide mentioned above is not sufficiently delayed in action to function in a commercially acceptable manner as the accelerator in a reinforcing oil furnace black tread stock.

It is an object of the present invention to provide a new class of thiazole sulfenamides, possessing excellent chemical stability and unique rubber vulcanization accelerating characteristics. It is also an object to provide improved rubber compositions or stocks free from tendency to scorch during factory processing operations. A further object is to provide an improved method of vulcanizing sulfur-vulcanizable rubbers. Another object is to provide improved vulcanized rubber compositions. The above and further objects will become apparent in the description of the invention which follows.

The objects of the invention are realized through the discovery of a new class of thiazole sulfenamides, the N-(propynyl)-2-(thiazole) sulfenamides of the following formula:

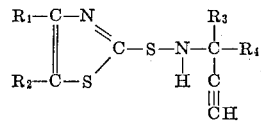

$R_1$ and $R_2$ are each hydrogen or an alkyl radical, or together with the ethylene nucleus to which they are attached they form an alicyclic or aromatic ring. $R_3$ is hydrogen or an alkyl radical, and $R_4$ is a hydrocarbon or substituted hydrocarbon radical, with the proviso that $R_3$ and $R_4$, together with the carbon atom to which they are attached, can constitute a cyclic hydrocarbon radical. A preferred group in the new class of compounds is one in which $R_3$ is methyl or ethyl or in which $R_3$ and $R_4$ join to form a cycloalkyl radical.

The new sulfenamides can be made by forming the monochloramine of a non-aromatic primary amine having an ethynyl group in the alpha position, and reacting the monochloramine with a 2-mercaptothiazole. Alternatively, a 2-mercaptothiazole can be condensed with an appropriate primary acetylenic amine in the present of an oxidizing agent. Suitable 2-mercaptothiazoles include, for example, mercaptothiazole, mercaptobenzothiazole, 4,5-dimethyl-mercaptothiazole, 4 - ethyl - mercaptothiazole, mercaptonaphthothiazole, mercapto-5,6,7,8 - tetrahydro-benzothiazole, mercapto - nitrobenzothiazole, mercapto-alkylbenzothiazoles, mercapto - arylbenzothiazoles, mercapto - methylbenzothiazoles, mercapto - dimethylbenzothiazoles, mercapto-phenylbenzothiazoles, mercapto-tolylbenzothiazoles, and mercapto-chlorobenzothiazole. Appropriate acetylenic amines include, for example, 1,1-dimethylpropynylamine (i.e., 3-amino-3-methyl-1-butyne), ethynylcyclopentylamine and ethynylcyclohexylamine. Other suitable amines include the following substituted propynylamines responding to the formula

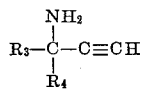

in which $R_3$ is hydrogen and $R_4$ is chosen from the following list of radicals or in which both $R_3$ and $R_4$ are chosen from the following list of radicals:

| | |
|---|---|
| Methyl | n-Propyl |
| n-Butyl | t-Butyl |
| Any amyl | Any heptyl |
| Any nonyl | Any dodecyl |
| Any octadecyl | Cyclopentyl |
| 1-methylcyclopentyl | Phenyl |
| 1-methylcyclohexyl | p-Chlorophenyl |
| Beta-naphthyl | Anthranyl |
| Tolyl | Allyl |
| Dimethylallyl | Octadecenyl |
| Ethyl | Isopropyl |
| Sec-butyl | Isobutyl |
| Any hexyl | Any octyl |
| Any decyl | Any hexadecyl |
| Eicosyl | Cyclohexyl |
| Benzyl | o-Hydroxyphenyl |
| o-Chlorophenyl | Alpha-naphthyl |
| m-Chlorophenyl | Phenanthryl |
| Biphenylyl | Methallyl |
| Diethylallyl | Diallylmethyl |

Additional examples of suitable amines in which $R_3$ and $R_4$ join to form a cyclic hydrocarbon radical include the following:

Ethynylcyclobutylamine
Ethynylcyclopropylamine
Ethynylcycloheptylamine
Ethynylcyclooctylamine
Ethynylcyclobutenylamine
Ethynylcyclopentenylamine
Ethynylcyclohexenylamine
Ethynylcycloheptenylamine
Ethynylcyclooctenylamine
Ethynylcyclodecylamine
Ethynylcyclodecenylamine
Ethynylcyclohexadienylamine
Ethynylcycloheptadienylamine
Ethynylcyclooctadienylamine
Ethynylcycloheptatrienylamine
Ethynylcyclooctatrienylamine The above amines can be prepared from the appropriate carbonyl compound in accordance with the following series of reactions:

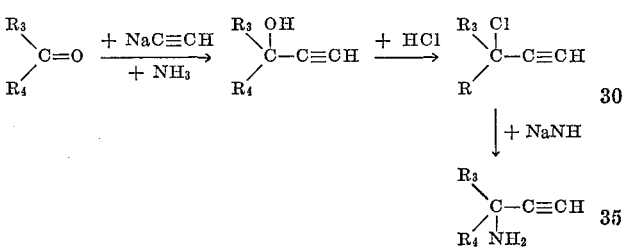

The invention is illustrated by the following examples.

EXAMPLE 1

The acetylenic amine, 1,1-dimethyl-2-propynylamine, was obtained in accordance with the reactions set out above from acetone as the basic starting material. This amine boiled at 78.5–81° C. at atmospheric pressure and had a refractive index, $n_D^{19}$, of 1.4260. The amine was converted to a thiazole sulfenamide as follows:

Reactants:

0.15 mole 2-mercaptobenzothiazole
0.15 mole sodium hydroxide
47 ml. water
0.285 mole 1,1-dimethyl-2-propynylamine
150 ml. 1 molar $KI_3$ solution The sodium hydroxide and then the thiazole were dissolved in the water. The amine was mixed with the mercaptobenzothiazole salt solution at 25–30° C., and then the $KI_3$ solution was gradually added with stirring at 25–30° C. Then the reaction mixture was poured into 500 ml. of ice and water, and a solid, light green precipitate separated. The precipitate was washed with water several times and air-dried. Since the crude product melted at 130–155° C., it was extracted with diethyl ether to yield 16.8 grams of an ether soluble substance (36% of theory for the desired sulfenamide), which after recrystallization from a methanol-water mixture melted at 110–111.5° C. This product, N-(1,1-dimethyl-2-propynyl)-2-benzothiazole sulfenamide, a very stable solid, was analyzed, with the following results:

|  | Percent Nitrogen | Percent Sulfur |
|---|---|---|
| Calculated from the formula | 11.28 | 25.82 |
| Found | 10.97 | 25.62 |

EXAMPLE 2

Starting with methyl ethyl ketone, 1-methyl-1-ethyl-2-propynylamine was obtained by the method set out above. This amine boiled at 50–52° C. at 120 mm. The refractive index, $n_D^{20}$, of the amine was in the range of 1.4345 to 1.4360 (several preparations were made). The amine was converted to a thiazole sulfenamide by the method of Example 1.

Reactants:

0.1 mole 2-mercaptobenzothiazole
0.20 mole sodium hydroxide
47 ml. water
0.31 mole 1-methyl-1-ethyl-2-propynylamine
125 ml. 1 molar $KI_3$ solution Results:

Yield 100% crude product, 59.5% of recrystallized product, N-(1-methyl-1-ethyl-2-propynyl)-2-benzothiazole sulfenamide, a very stable solid, melting at 94.5–95° C., and analyzing as follows:

|  | Percent Nitrogen | Percent Sulfur |
|---|---|---|
| Calculated from the formula | 10.68 | 24.43 |
| Found | 10.28 | 24.46 |

EXAMPLE 3

Starting with methyl isobutyl ketone, 1-methyl-1-isobutyl-2-propynylamine was obtained by the general method given above. This amine boiled at 45° C. at 4.5 mm. and possessed a refractive index, $n_D^{20}$, of 1.4375. The amine hydrochloride melted at 240° C. and analyzed as follows:

|  | Percent Nitrogen | Percent Chlorine |
|---|---|---|
| Calculated from the formula | 8.67 | 22.00 |
| Found | 8.61 | 21.81 |

The amine was converted to a thiazole sulfenamide by the method of Example 1 in a yield of 86%. The purified product, N-(1-methyl-1-isobutyl-2-propynyl)-2-benzothiazole sulfenamide, a stable solid, melted at 124.5–126.5° C. and analyzed as follows:

|  | Percent Sulfur | Percent Nitrogen |
|---|---|---|
| Calculated from the formula | 22.05 | 9.64 |
| Found | 22.00 | 9.44 |

EXAMPLE 4

Starting with methyl n-hexyl ketone, 1-methyl-1-n-hexyl-2-propynylamine was obtained by the above-described method. This amine boiled at 77.5° C. at 10.9 mm. and possessed a refractive index, $n_D^{20}$, of 1.4433. The amine hydrochloride melted at 155.5–156.5° C. and analyzed as follows:

|  | Percent Nitrogen | Percent Chlorine |
|---|---|---|
| Calculated from the formula | 7.39 | 18.71 |
| Found | 7.24 | 18.63 |

The amine was converted to a thiazole sulfenamide by the method of Example 1 in a yield of 71%. The purified product, N-(1-methyl-1-n-hexyl-2-propynyl)-2-benzothiazole sulfenamide, a stable solid, melted at 92.5–94.5° C. and analyzed as follows:

|  | Percent Sulfur | Percent Nitrogen |
|---|---|---|
| Calculated from the formula | 20.19 | 8.80 |
| Found | 20.40 | 8.72 |

EXAMPLE 5

Starting with cyclohexanone, 1-ethynyl-cyclohexylamine was obtained by the above general method. This amine boiled at 56–63° C. at 14 mm. and possessed a refractive index, $n_D^{20}$, of 1.4817. The amine hydrochloride melted at 270.5° C. and analyzed as follows:

|  | Percent Nitrogen | Percent Chlorine |
|---|---|---|
| Calculated from the formula | 8.78 | 22.25 |
| Found | 8.70 | 22.01 |

The amine was converted to a thiazole sulfenamide by the method of Example 1 in a yield of 47%. The purified product, N-(1-ethynylcyclohexyl)-2-benzothiazole sulfenamide, a very stable solid, melted at 110–112° C. and analyzed as follows:

|  | Percent Sulfur | Percent Nitrogen |
|---|---|---|
| Calculated from the formula | 22.00 | 9.70 |
| Found | 21.70 | 9.33 |

*Example 6*

Reactants:
    35 grams (0.36 mole) 1-methyl-1-ethyl-2-propynylamine
    7.2 grams (0.18 mole) sodium hydroxide
    45 ml. water
    80 ml. 95% ethyl alcohol
    10.3 grams (0.07 mole) 2-mercapto-4,5-dimethylthiazole
    100 ml. 1 molar $KI_3$ solution The sodium hydroxide was dissolved in the water, and the mercaptothiazole was dissolved in this caustic solution. The amine was added, and the alcohol was mixed in to insure a homogeneous solution. Then the $KI_3$ solution was added dropwise at 26° C. with stirring during 90 minutes. No precipitate was apparent until 10 ml. of water was added, and then a small amount of precipitate appeared. The reaction vessel was stored at 5° C. overnight in an icebox. The considerable precipitate thereby obtained was separated by filtration and was air-dried. The reaction product was obtained in a yield of 12.0 grams, 71% of theory, melting at 93–96° C. After recrystallization from a methanol-water mixture the product, N - (1 - methyl-1-ethyl-2-propynyl)-2-(4,5-dimethylthiazole) sulfenamide, a very stable crystalline solid, melted at 92.5–94.5° C. and analyzed as follows:

|  | Percent Sulfur | Percent Nitrogen |
|---|---|---|
| Calculated from the formula | 26.69 | 11.66 |
| Found | 26.75 | 11.48 |

Additional examples of the sulfenamides of the invention are produced from the appropriate amines and mercaptothiazoles, and are listed as follows:

N-(1-methyl-1-ethyl-2-propynyl)-2-thiazole sulfenamide
N-(1-ethyl-1-isobutyl-2-propynyl)-2-(4-ethylthiazole) sulfenamide
N-(1,1-diethyl-2-propynyl)-2-(6-phenylbenzothiazole) sulfenamide
N-(1-n-propyl-1-n-amyl-2-propynyl)-2-(4-p-tolylbenzothiazole) sulfenamide
N-(1-methyl-1-eicosyl-2-propynyl)-2-(6-chlorobenzothiazole) sulfenamide
N-[1-ethyl-1-(1-methylcyclopentyl)-2-propynyl]-2-(5,6,7,8-tetrahydrobenzothiazole) sulfenamide
N-(1-methyl-1-allyl-2-propynyl)-2-naphthobenzothiazole sulfenamide
N-(1-methyl-1-t-dodecyl-2-propynyl)-2-(6-nitrobenzothiazole) sulfenamide
N-(1-methyl-1-benzyl-2-propynyl)-2-benzothiazole sulfenamide
N-(1-ethynylcyclopentyl)-2-(4,6-dimethylbenzothiazole) sulfenamide
N-(1-ethynylcyclobutenyl)-2-benzothiazole sulfenamide
N-(1-ethynylcyclohexadienyl)-2-benzothiazole sulfenamide
N-(1-ethynylcycloheptatrienyl)-2-benzothiazole sulfenamide These additional examples have properties equivalent to those of the preceding examples described in detail hereinabove.

The sulfenamides of the invention are effective delayed-action vulcanization accelerators in any of the sulfur-vulcanizable diene rubbers including, without limitations, natural rubber, various synthetic rubbers such as SBR (butadiene-styrene), BR, IR, ABR, PBR, SIR, neoprene (polychloroprene or CR), butyl rubber (IIR) and suitable mixtures thereof. (The abbreviations are in accord with the ASTM Designation: D1418–56T.) The usual curing temperatures employed by the art can be utilized, suitably in the range from about 250° to about 400° F. The amount of accelerator employed will depend on the particular rubber composition being vulcanized, as will be understood by one skilled in the art, for example, between 0.05 and 5 parts by weight per one hundred parts of the rubber (phr.). The sulfenamides of the invention are effective accelerators of vulcanization by free sulfur or by a vulcanizing agent of the sulfur-donor type, including without limitation various known phenol polysulfides including the alkyl derivatives thereof, the xanthogen polysulfides, the thiuram disulfides and other polysulfides, various amine polysulfides including the dialkylamine polysulfides, heterocyclic amine polysulfides and reaction products of primary amines with excess sulfur. The sulfenamides are useful in all other types of rubber stocks besides tire tread stocks and can be mixed with the rubber on a rubber mill, in a Banbury, in a solvent rubber cement, in latex or water dispersion or in any other manner known to the art of mixing a compounding ingredient with a rubber.

The sulfenamides of Examples 1 and 2 were tested as delayed-action vulcanization accelerators in a natural rubber tire tread stock reinforced by a reinforcing oil furnace black in accordance with Formula A.

*Formula A*

| Ingredients: | Parts by weight |
|---|---|
| Rubber (smoked sheets) | 100 |
| HAF carbon black | 50 |
| Zinc oxide | 3 |
| Stearic acid | 2.6 |
| Plasticizer | 3 |
| Antioxidant | 1.8 |
| Sulfur | 2.6 |
| Accelerator | 0.5 |

The two test stocks in accordance with Formula A were each thoroughly mixed in the usual manner in a rubber mill. The Mooney Scorch Test (J. V. Weaver, Rubber Age, volume 48, pages 89–95 (1940)) was applied to samples of the two stocks, and the test results in minutes are shown in Table I.

TABLE I.—MOONEY SCORCH AT 250° F.

| | Initial | 10 Point Rise |
|---|---|---|
| Stock Containing— | | |
| Sulfenamide of Example 1 | 32 | >40 |
| Sulfenamide of Example 2 | 30 | >40 |

The results shown in Table I indicate the new sulfenamides to be very effective delayed-action accelerators, providing complete freedom from scorch during normal factory processing of a natural rubber furnace black tire tread stock containing one of them. Other portions of the two stocks were vulcanized at 280° F., and the following normal and aged tensile data were obtained ("p.s.i." means pounds per square inch):

TABLE II.—NORMAL PHYSICAL PROPERTIES

|  | Stock Containing Sulfenamide of— | |
|---|---|---|
|  | Example 1 | Example 2 |
| Modulus at 300% (p.s.i.): | | |
| 30 minute cure | 1,300 | 1,200 |
| 45 minute cure | 1,875 | 1,700 |
| 60 minute cure | 2,075 | 1,875 |
| 90 minute cure | 2,225 | 2,100 |
| Modulus at 400% (p.s.i.): | | |
| 30 minute cure | 2,250 | 2,175 |
| 45 minute cure | 2,850 | 2,800 |
| 60 minute cure | 3,250 | 3,050 |
| 90 minute cure | 3,450 | 3,375 |
| Tensile strength (p.s.i.): | | |
| 30 minute cure | 3,350 | 3,400 |
| 45 minute cure | 4,200 | 3,975 |
| 60 minute cure | 4,225 | 4,000 |
| 90 minute cure | 3,975 | 4,225 |
| Elongation (Percent at Break): | | |
| 30 minute cure | 485 | 535 |
| 45 minute cure | 510 | 530 |
| 60 minute cure | 470 | 490 |
| 90 minute cure | 460 | 485 |

PROPERTIES AFTER AGING 2 DAYS AT 212° F. (OVEN)

| Modulus at 300% (p.s.i.): | | |
|---|---|---|
| 30 minute cure | 1,575 | 1,500 |
| 45 minute cure | 1,925 | 1,775 |
| 60 minute cure | 1,950 | 1,900 |
| 90 minute cure | | |
| Tensile strength (p.s.i.): | | |
| 30 minute cure | 2,575 | 2,675 |
| 45 minute cure | 2,300 | 2,525 |
| 60 minute cure | 2,000 | 2,325 |
| 90 minute cure | 1,850 | 2,050 |
| Elongation (Percent at Break): | | |
| 30 minute cure | 425 | 450 |
| 45 minute cure | 360 | 400 |
| 60 minute cure | 310 | 355 |
| 90 minute cure | 265 | 295 |

Table II shows that the new accelerators impart good physical properties to natural rubber tread stocks and that these properties are substantially maintained after a severe aging period.

In a similar manner the sulfenamides of Examples 1 and 2 were tested as delayed-action accelerators in a synthetic rubber tire tread stock in accordance with Formula B.

*Formula B*

Ingredients: Parts by weight
SBR (LTP)* _____ 100
HAF carbon black _____ 48
Zinc oxide _____ 3
Petroleum oil (naphthenic) _____ 8
Stearic acid _____ 2
Antioxidant _____ 0.6
Sulfur _____ 2
Accelerator _____ 1.2

*Rubbery butadiene-styrene copolymer prepared by emulsion polymerization at 41° F.

The two test stocks in accordance with Formula B were each thoroughly mixed in the usual manner in a rubber mill. Results of the Mooney Scorch Test are shown in Table III.

TABLE III.—MOONEY SCORCH AT 265° F.

|  | Initial | 10 Point Rise |
|---|---|---|
| Stock Containing— | | |
| Sulfenamide of Example 1 | >40 | >40 |
| Sulfenamide of Example 2 | >40 | >40 |

Table III illustrates the high degree of safety from scorch afforded by use of the new sulfenamides in a conventional type of synthetic rubber tire tread stock. Other portions of the two stocks were cured at 280° F., and the following normal and aged tensile data were obtained:

TABLE IV.—NORMAL PHYSICAL PROPERTIES

|  | Stock Containing Sulfenamide of— | |
|---|---|---|
|  | Example 1 | Example 2 |
| Modulus at 400%: | | |
| 45 minute cure | 150 | (¹) |
| 60 minute cure | 375 | 150 |
| 90 minute cure | 1,550 | 1,350 |
| Tensile strength: | | |
| 45 minute cure | 150 | (¹) |
| 60 minute cure | 1,025 | 325 |
| 90 minute cure | 3,400 | 2,800 |
| Elongation: | | |
| 45 minute cure | 810 | (⁵) |
| 60 minute cure | 815 | 820 |
| 90 minute cure | 680 | 680 |

PROPERTIES AFTER AGING 2 DAYS AT 212° F. (OVEN)

| Modulus at 400%: | | |
|---|---|---|
| 45 minute cure | 1,275 | (¹) |
| 60 minute cure | 2,300 | 1,425 |
| 90 minute cure | | 2,725 |
| Tensile strength: | | |
| 45 minute cure | 2,425 | (¹) |
| 60 minute cure | 3,325 | 2,800 |
| 90 minute cure | 2,950 | 3,275 |
| Elongation: | | |
| 45 minute cure | 625 | (¹) |
| 60 minute cure | 540 | 645 |
| 90 minute cure | 355 | 465 |

¹ No cure.

Table IV shows that the new sulfenamides are quite delayed-action in a conventional SBR tread stock but that they gave a good cure in 90 minutes at 280° F., and that the cured stock withstood aging extremely well.

The novel sulfenamides of Examples 3, 4 and 5 were tested as delayed-action accelerators in the natural rubber stock of Formula A. Results of the Mooney Scorch Test are given in Table V.

TABLE V.—MOONEY SCORCH AT 250° F.

|  | Initial | 10 Point Rise |
|---|---|---|
| Stock Containing— | | |
| Sulfenamide of Example 3 | 27.0 | >40 |
| Sulfenamide of Example 4 | 29.0 | >40 |
| Sulfenamide of Example 5 | 29.5 | >40 |

Table V shows that the sulfenamides of Examples 3, 4 and 5 are quite similar to those of Examples 1 and 2 in providing freedom from scorch of natural rubber furnace black tire tread stocks during normal factory processing. Other portions of the three stocks were vulcanized at 280° F., and the following normal and aged tensile data were obtained:

TABLE VI.—NORMAL PHYSICAL PROPERTIES

|  | Stock Containing Sulfenamide of— | | |
|---|---|---|---|
|  | Example 3 | Example 4 | Example 5 |
| Modulus at 300%: |  |  |  |
| 45 minute cure | 1,925 | 1,950 | 1,975 |
| 60 minute cure | 2,200 | 2,125 | 2,075 |
| 90 minute cure | 2,325 | 2,250 | 2,350 |
| Tensile strength: |  |  |  |
| 45 minute cure | 4,025 | 4,050 | 4,125 |
| 60 minute cure | 4,150 | 4,225 | 4,000 |
| 90 minute cure | 4,050 | 4,025 | 4,275 |
| Elongation: |  |  |  |
| 45 minute cure | 540 | 540 | 540 |
| 60 minute cure | 520 | 530 | 510 |
| 90 minute cure | 480 | 490 | 500 |
| PROPERTIES AFTER AGING 2 DAYS AT 212° F. | | | |
| Modulus at 300%: |  |  |  |
| 45 minute cure | 1,750 | 1,800 | 1,800 |
| 60 minute cure | 1,900 | 2,000 | 1,950 |
| 90 minute cure | 2,200 | 2,225 | 2,250 |
| Tensile strength: |  |  |  |
| 45 minute cure | 2,600 | 2,475 | 2,450 |
| 60 minute cure | 2,525 | 2,575 | 2,525 |
| 90 minute cure | 2,350 | 2,375 | 2,250 |
| Elongation: |  |  |  |
| 45 minute cure | 410 | 400 | 400 |
| 60 minute cure | 380 | 380 | 400 |
| 90 minute cure | 310 | 310 | 300 |

Table VI shows that the three new accelerators impart good physical properties to natural rubber tread stocks and that these properties are substantially retained after a severe aging treatment.

In a similar manner the sulfenamides of Examples 3 and 4 were tested as delayed-action accelerators in a synthetic rubber tire tread stock in accordance with Formula B. Results of the Mooney Scorch Test are shown in Table VII.

TABLE VII.—MOONEY SCORCH AT 275° F.

|  | Initial | 10 Point Rise |
|---|---|---|
| Stock containing— |  |  |
| Sulfenamide of Example 3 | 23 | >40 |
| Sulfenamide of Example 4 | 26 | >40 |

Table VII shows that even at the high testing temperature of 275° F. the new accelerators possess good delayed action. Other portions of the two stocks were cured at 300° F., and the following normal and aged tensile data were obtained:

TABLE VIII.—NORMAL PHYSICAL PROPERTIES

|  | Stock Containing Sulfenamide of— | |
|---|---|---|
|  | Example 3 | Example 4 |
| Modulus at 300%: |  |  |
| 30 minute cure | 250 | 175 |
| 45 minute cure | 1,125 | 1,000 |
| 60 minute cure | 1,700 | 1,650 |
| Tensile strength: |  |  |
| 30 minute cure | 650 | 400 |
| 45 minute cure | 3,300 | 3,000 |
| 60 minute cure | 3,650 | 3,625 |
| Elongation: |  |  |
| 30 minute cure | 870 | 1,040 |
| 45 minute cure | 680 | 670 |
| 60 minute cure | 550 | 560 |
| PROPERTIES AFTER AGING 2 DAYS AT 212° F. | | |
| Modulus at 300%: |  |  |
| 30 minute cure | 1,000 | 925 |
| 45 minute cure | 2,325 | 2,250 |
| 60 minute cure | 2,800 | 2,800 |
| Tensile strength: |  |  |
| 30 minute cure | 2,750 | 2,600 |
| 45 minute cure | 3,475 | 3,500 |
| 60 minute cure | 3,300 | 3,375 |
| Elongation: |  |  |
| 30 minute cure | 650 | 680 |
| 45 minute cure | 430 | 420 |
| 60 minute cure | 350 | 370 |

Table VIII shows that the new sulfenamides were quite delayed in action in a conventional SBR tread stock but that they gave good cures in 45 and 60 minutes at 300° F., and that the cured stocks withstood aging remarkably well.

I claim:

1. A vulcanizable composition comprising a sulfur vulcanizable diene rubber, sulfur and between 0.05 and 5 phr. of an N-(propynyl)-2-(thiazole) sulfenamide selected from the class consisting of those sulfenamides having one of the following formulas:

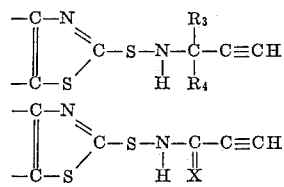

wherein $R_3$ is a member selected from the group consisting of hydrogen and lower alkyl; $R_4$ is a member selected from the group consisting of alkyl of no more than 20 carbon atoms, alkenyl of no more than 18 carbon atoms, cycloalkyl of no more than 7 carbon atoms and hydrocarbon aryl of no more than 14 carbon atoms;

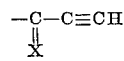

is a member of the group consisting of ethynylcycloalkyl and ethynylcycloalkenyl containing no more than 12 carbon atoms, ethynylcycloalkadienyl and ethynylcycloalkatrienyl containing no more than 10 carbon atoms; and the valences of the carbon atoms in the 4- and 5-positions of the thiazole ring are satisfied by a member selected from the group consisting of hydrogen, methyl, ethyl and residues of carbocyclics, said carbocyclics containing no more than 13 carbon atoms and being a member selected from the group consisting of unsubstituted naphtho, unsubstituted benzo, 5, 6, 7, 8-tetrahydrobenzo, nitrobenzo, alkylbenzo, methylbenzo, dimethylbenzo, phenylbenzo, tolylbenzo and chlorobenzo.

2. Method of vulcanizing rubber comprising heating the composition of claim 1.

3. A vulcanizable composition comprising a sulfur-vulcanizable diene rubber, sulfur and between 0.05 and 5 phr. of a compound of the structure

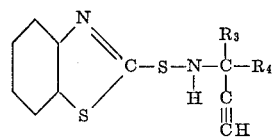

wherein $R_3$ is a lower alkyl and $R_4$ is an alkyl of no more than 20 carbon atoms.

4. Method of vulcanizing rubber comprising heating the composition of claim 3.

5. A vulcanizable composition comprising a sulfur-vulcanizable diene rubber, sulfur and between 0.05 and 5 phr. of a compound of the structure

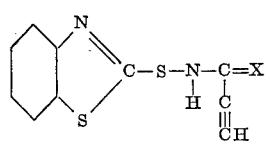

wherein is ethynylcycloalkyl of no more than 12 carbon atoms.

6. Method of vulcanizing rubber comprising heating the composition of claim 5.

7. A vulcanizable composition comprising a sulfur-vulcanizable diene rubber, sulfur and between 0.05 and 5 phr. of a compound of the structure

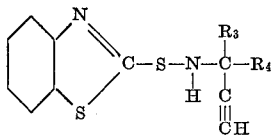

wherein $R_3$ is a lower alkyl and $R_4$ is a cycloalkyl of no more than 7 carbon atoms.

8. Method of vulcanizing rubber comprising heating the composition of claim 7.

9. A vulcanizable composition comprising a sulfur-vulcanizable diene rubber, sulfur and between 0.05 and 5 phr. of N-(1,1-dimethyl-2-propynyl)-2-benzothiazole sulfenamide.

10. Method of vulcanizing rubber comprising heating the composition of claim 9.

11. A vulcanizable composition comprising a sulfur-vulcanizable diene rubber, sulfur and between 0.05 and 5 phr. of N-(1-methyl-1-ethyl-2-propynyl)-2-benzothiazole sulfenamide.

12. Method of vulcanizing rubber comprising heating the composition of claim 11.

13. A vulcanizable composition comprising a sulfur-vulcanizable diene rubber, sulfur and between 0.05 and 5 phr. of N-(1-methyl-1-isobutyl-2-propynyl)-2-benzothiazole sulfenamide.

14. Method of vulcanizing rubber comprising heating the composition of claim 13.

15. A vulcanizable composition comprising a sulfur-vulcanizable diene rubber, sulfur and between 0.05 and 5 phr. of N-(1-methyl-1-n-hexyl-2-propynyl)-2-benzothiazole sulfenamide.

16. Method of vulcanizing rubber comprising heating the composition of claim 15.

17. A vulcanizable composition comprising a sulfur-vulcanizable diene rubber, sulfur and between 0.05 and 5 phr. of N-(1-ethynylcyclohexyl)-2-benzothiazole sulfenamide.

18. Method of vulcanizing rubber comprising heating the composition of claim 17.

References Cited by the Examiner
UNITED STATES PATENTS 2,769,010    10/1956    D'Amico _____ 260—302
2,875,208    2/1959    D'Amico _____ 260—306.61

JOSEPH L. SCHOFER, *Primary Examiner.*

M. LIEBMAN, *Examiner.*